(12) United States Patent
Hine

(10) Patent No.: US 6,286,573 B1
(45) Date of Patent: Sep. 11, 2001

(54) TIRE WITH LIGHT REFLECTING FLUORESCENT STRIPS

(76) Inventor: Gerald W. Hine, 2101 Charles, Houston, TX (US) 77093

( * ) Notice: Subject to any disclaimer, the term of this patent is extended or adjusted under 35 U.S.C. 154(b) by 0 days.

(21) Appl. No.: 09/234,657

(22) Filed: Jan. 21, 1999

(51) Int. Cl.[7] .............. B60C 1/00; B60C 11/04; B60C 13/04; B60C 101/00
(52) U.S. Cl. ................ 152/209.5; 152/209.18; 152/524; 152/DIG. 12; 152/901
(58) Field of Search ............... 152/209.1, 209.5, 152/209.18, 209.27, 523, 524, DIG. 12, 901, 154.2

(56) References Cited

U.S. PATENT DOCUMENTS

| | | | |
|---|---|---|---|
| D. 379,167 | * | 5/1997 | Attinello et al. . |
| 1,170,154 | * | 2/1916 | Hennig . |
| 2,102,784 | * | 12/1937 | Bridges . |
| 2,566,328 | * | 9/1951 | Hessney et al. . |
| 3,452,799 | * | 7/1969 | Hindin et al. . |
| 3,729,041 | * | 4/1973 | Kubota . |
| 3,770,040 | * | 11/1973 | DeCicco . |
| 3,789,898 | * | 2/1974 | Montagne . |
| 3,944,457 | * | 3/1976 | Podvin et al. . |
| 3,946,782 | * | 3/1976 | Petrasek et al. . |
| 4,170,503 | * | 10/1979 | Buchanan et al. . |
| 4,198,774 | * | 4/1980 | Roberts et al. . |
| 4,226,274 | * | 10/1980 | Awaya et al. . |
| 4,648,689 | * | 3/1987 | May . |
| 5,303,756 | * | 4/1994 | Hill . |
| 5,303,758 | * | 4/1994 | Clementz et al. . |

FOREIGN PATENT DOCUMENTS

| | | | | |
|---|---|---|---|---|
| 9102607 U1 | * | 7/1991 | (DE) . | |
| 448223 | * | 6/1936 | (GB) | ............... 152/154.2 |
| 2265586 | * | 10/1993 | (GB) . | |
| 59-75808 | * | 4/1984 | (JP) . | |
| 61-146605 | * | 7/1986 | (JP) . | |
| 3-54004 | * | 3/1991 | (JP) . | |
| 4-202339 | * | 7/1992 | (JP) . | |
| 6-40219 | * | 2/1994 | (JP) . | |
| 6-262910 | * | 9/1994 | (JP) . | |
| 8-318715 | * | 12/1996 | (JP) . | |

* cited by examiner

Primary Examiner—Steven D. Maki

(57) ABSTRACT

A tire with light reflecting fluorescent strips for helping enhance the visibility of a vehicle. The tire with light reflecting fluorescent strips includes a spaced apart pair of side walls and a tread portion connecting the side walls together. The tread portion has a plurality of alternating ridges and grooves therearound. The tread portion also has at least one annular light reflecting reflective strip in at least one of the grooves of the tread portion.

1 Claim, 2 Drawing Sheets

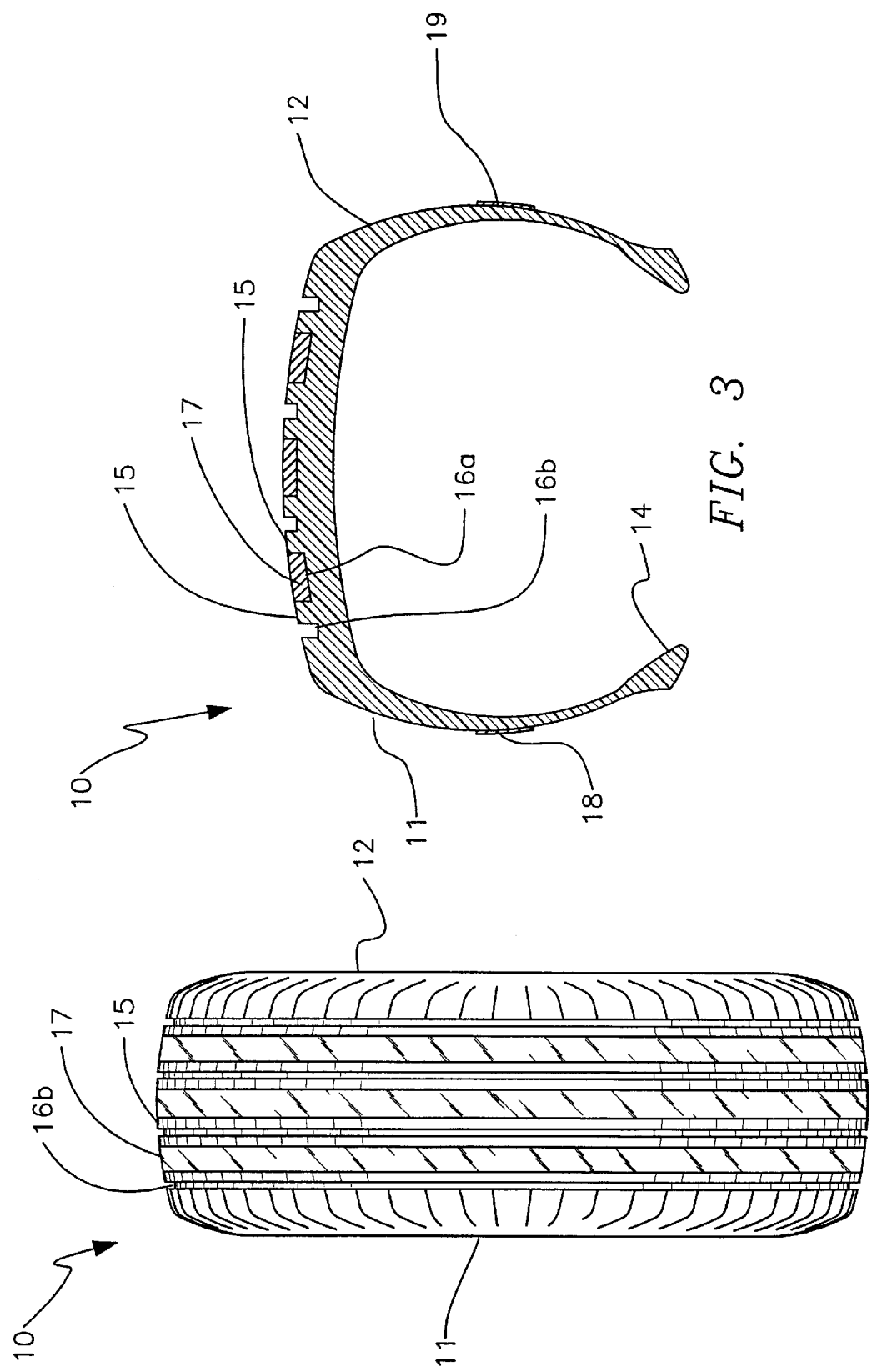

TIRE WITH LIGHT REFLECTING FLUORESCENT STRIPS

BACKGROUND OF THE INVENTION

1. Field of the Invention

The present invention relates to tires and more particularly pertains to a new tire with light reflecting fluorescent strips for helping enhance the visibility of a vehicle.

2. Description of the Prior Art

The use of tires is known in the prior art. More specifically, tires heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U. S. Pat. No. 3,944,457 by Podvin et al.; U.S. Pat. No. 5,303,758 by Clementz et al.; U.S. Pat. No. 4,198,774 by Roberts et al.; U.S. Pat. No. 4,648,689 by May; U.S. Pat. No. Des. 379,167 by Attinello et al.; and U.S. Pat. No. 2,566,328 by Hessney et al which are all incorporated by reference herein.

While these devices fulfill their respective, particular objectives and requirements, the aforementioned patents do not disclose a new tire with light reflecting fluorescent strips. The inventive device includes a spaced apart pair of side walls and a tread portion connecting the side walls together. The tread portion has a plurality of alternating ridges and grooves therearound. The tread portion also has at least one annular light reflecting reflective strip in at least one of the grooves of the tread portion.

In these respects, the tire with light reflecting fluorescent strips according to the present invention substantially departs from the conventional concepts and designs of the prior art, and in so doing provides an apparatus primarily developed for the purpose of helping enhance the visibility of a vehicle.

SUMMARY OF THE INVENTION

In view of the foregoing disadvantages inherent in the known types of tires now present in the prior art, the present invention provides a new tire with light reflecting fluorescent strips construction wherein the same can be utilized for helping enhance the visibility of a vehicle.

The general purpose of the present invention, which will be described subsequently in greater detail, is to provide a new tire with light reflecting fluorescent strips apparatus and method which has many of the advantages of the tires mentioned heretofore.

To attain this, the present invention generally comprises a spaced apart pair of side walls and a tread portion connecting the side walls together. The tread portion has a plurality of alternating ridges and grooves therearound. The tread portion also has at least one annular light reflecting reflective strip in at least one of the grooves of the tread portion.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new tire with light reflecting fluorescent strips apparatus and method which has many of the advantages of the tires mentioned heretofore.

It is another object of the present invention to provide a new tire with light reflecting fluorescent strips which may be easily and efficiently manufactured and marketed.

It is a further object of the present invention to provide a new tire with light reflecting fluorescent strips which is of a durable and reliable construction.

An even further object of the present invention is to provide a new tire with light reflecting fluorescent strips which is susceptible of a low cost of manufacture with regard to both materials and labor, and which accordingly is then susceptible of low prices of sale to the consuming public, thereby making such tire with light reflecting fluorescent strips economically available to the buying public.

Still yet another object of the present invention is to provide a new tire with light reflecting fluorescent strips which provides in the apparatuses and methods of the prior art some of the advantages thereof, while simultaneously overcoming some of the disadvantages normally associated therewith.

Still another object of the present invention is to provide a new tire with light reflecting fluorescent strips for helping enhance the visibility of a vehicle.

Yet another object of the present invention is to provide a new tire with light reflecting fluorescent strips which includes a spaced apart pair of side walls and a tread portion connecting the side walls together. The tread portion has a plurality of alternating ridges and grooves therearound. The tread portion also has at least one annular light reflecting reflective strip in at least one of the grooves of the tread portion.

Still yet another object of the present invention is to provide a new tire with light reflecting fluorescent strips that makes it easier to view a vehicle especially from the side in low visibility and low light conditions.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a schematic front view of the present invention.

FIG. 3 is a schematic transverse cross sectional view of the present invention.

DESCRIPTION OF THE PREFERRED EMBODIMENT

Figure 1:
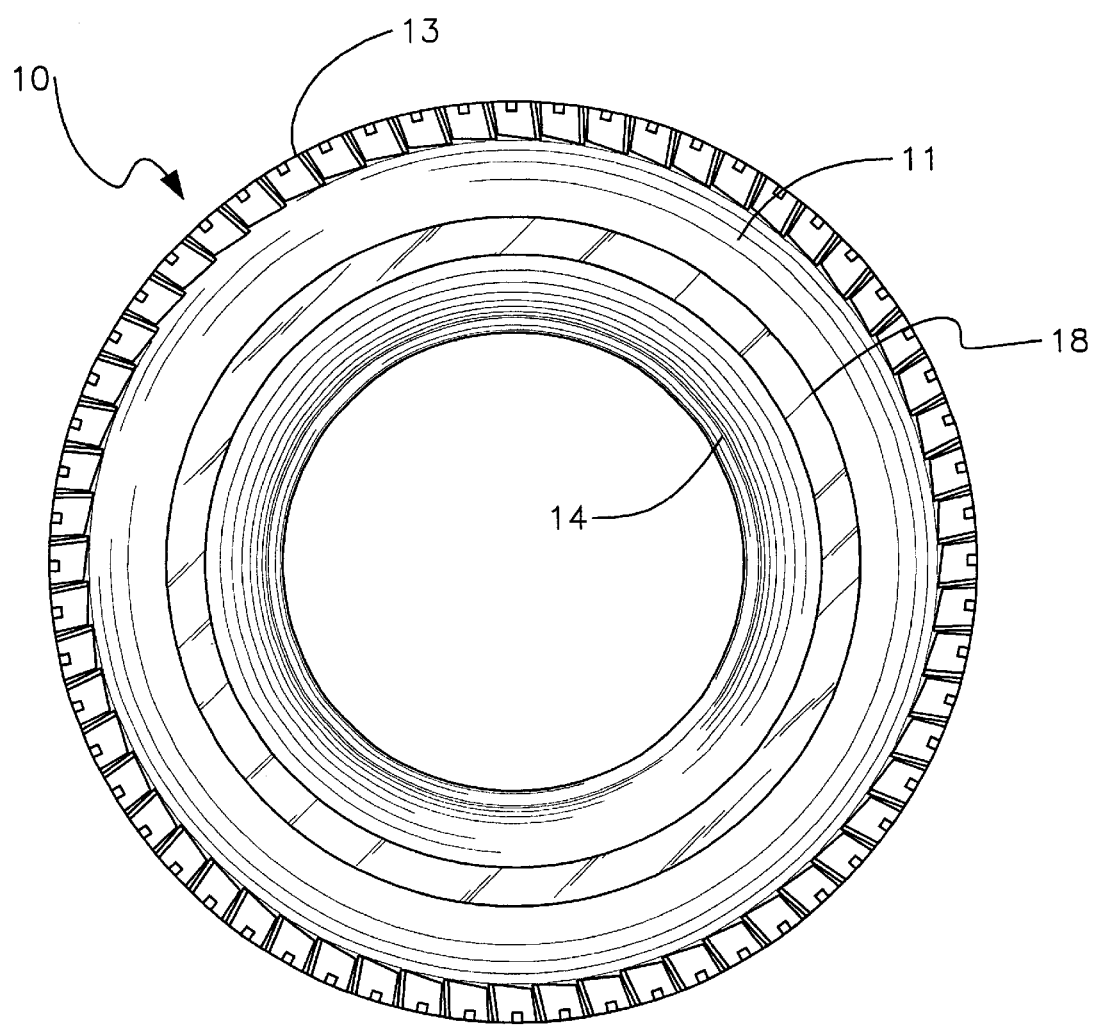
FIG. 1 is a schematic side view of a new tire with light reflecting fluorescent strips according to the present invention.

With reference now to the drawings, and in particular to FIGS. 1 through 3 thereof, a new tire with light reflecting fluorescent strips embodying the principles and concepts of the present invention and generally designated by the reference numeral 10 will be described.

As best illustrated in FIGS. 1 through 3, the tire with light reflecting fluorescent strips 10 generally comprises a spaced apart pair of side walls and a tread portion connecting the side walls together. The tread portion has a plurality of alternating ridges and grooves therearound. The tread portion also has at least one annular light reflecting reflective strip in at least one of the grooves of the tread portion.

In closer detail, the rubber tire comprises a spaced apart pair of annular side walls 11,12 and an annular tread portion 13 integrally connecting the side walls together. Each of the side walls terminates at a generally circular beaded inner edge 14. The tread portion has a plurality of alternating annular ridges 15 and grooves 16a,16b therearound such that each of the grooves of the tread portion is positioned between a pair of ridges of the tread portion.

The tread portion has at least one annular light reflecting reflective strip 17 in at least one of the grooves of the tread portion. Each of the side walls preferably has an annular light reflecting reflective strip 18,19 thereon. The reflective strips of the side walls are preferably positioned generally equidistantly between the tread portion and the inner edge of the respective side wall. Ideally, the reflective strips of the side walls are positioned where a whitewall on the side wall would be positioned.

The reflecting strips each comprise a light reflecting material having a greater reflection factor than the tread portion and the side walls of the tire. For purposes of this specification, reflection factor is defined as the ration of the luminous flux reflected from a surface to that falling upon it. In other words, more light striking the reflective strip reflects off of reflective strip than the amount of light is reflected from striking the tread portion. In this way, the reflective strips may be visible a greater distance than the rest of the tire in low light and low visibility conditions. Additionally, the reflecting strips each comprise a fluorescent colored material for further enhancing visibility in low light and low visibility conditions.

As best illustrated in FIG. 3, preferably, the reflective strips of the tread portion substantially fill their associated the groove. That is to say, the reflecting strips in the grooves each substantially occupy the area bounded by the associated groove. Ideally, each of the reflective strips of the tread portion has an upper surface generally coplanar with upper surfaces of the adjacent ridges of the tread portion. The grooves of the tread portion each have a width defined in a direction extending between the side walls. Preferably, the plurality of grooves comprising alternating wide and narrow grooves with width of each wide groove 16a being greater than the width of each narrow groove 16b. In this preferred embodiment, the reflective strips of the tread portion are provided in the wide grooves of the tread portion.

Ideally, each of the strips has a width of between about 1 inch and about 3 inches. Each of the strips also ideally has a thickness defined inwardly from the upper surface of the respective strip of about ⅛ inch.

Optionally, the strips may configured to have a zigzag shape for further enhancing visibility of a strip to an observer.

In use, the tire is mounted to a wheel of a vehicle so that viewers may visibly detect the tire a distance away from the vehicle especially in low visibility and low light conditions. It should be understood that this invention may be used for any wheeled vehicle including automobiles and bicycles.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:
1. A tire, comprising:
   a spaced apart pair of annular side walls and an annular tread portion integrally connecting said side walls together;
   each of said side walls terminating at a generally circular beaded inner edge;
   said tread portion having a plurality of alternating annular ridges and grooves therearound, such that each of said grooves of said tread portion is positioned between a pair of ridges of said tread portion, said grooves of said tread portion each having a width defined in a direction extending between said side walls;
   said tread portion having three annular light reflecting reflective strips each positioned in one of said grooves of said tread portion;
   each of said side walls having an annular light reflecting reflective strip thereon;
   each of said reflective strips of said walls being positioned generally equidistantly between said tread portion and the inner edge of the respective side wall;

each of said reflecting strips comprising a light reflecting material having a greater reflection factor than said tread portion;

wherein each of said reflecting strips comprises a fluorescent colored material;

each of said reflective strips of said tread portion having a depth and a width, said width and said depth of each of said respective strips being substantially equal to said depth and said width of a respective one of said grooves in which said strip is positioned such that each of said reflective strips substantially fills said grove and the outer surface of said strips is substantially flush with an outer surface of said ridges, wherein the width of said reflective strips is uniform from the outer surface of said reflective strip to the innermost portion of said reflective strip;

the outer surface of each of said reflective strips being generally coplanar with upper surfaces of the adjacent ridges of said tread portion;

said plurality of grooves comprising alternating wide and narrow grooves, said width of each wide groove being greater said width of each narrow groove; and each of said reflective strips of said tread portion being provided in each of said wide grooves of said tread portion.

\* \* \* \* \*